United States Patent [19]
Peralta et al.

[11] Patent Number: 5,246,499
[45] Date of Patent: Sep. 21, 1993

[54] APPARATUS FOR APPLYING SCRATCH-RESISTANT COATINGS TO PLASTIC OPHTHALMIC LENSES

[75] Inventors: Joseph L. Peralta, Hollywood; Jorge M. Rodriquez, Miami, both of Fla.

[73] Assignee: BMC Industries, Inc., Minneapolis, Minn.

[21] Appl. No.: 902,692

[22] Filed: Jun. 23, 1992

Related U.S. Application Data

[62] Division of Ser. No. 703,251, May 20, 1991, Pat. No. 5,164,228.

[51] Int. Cl.$^5$ .............................................. B29D 11/00
[52] U.S. Cl. .................................. 118/641; 118/695; 118/704; 425/808
[58] Field of Search ................................ 118/641–642, 118/232, 319, 704, 695; 427/541, 164; 425/808, DIG. 201; 264/1.7

[56] References Cited

U.S. PATENT DOCUMENTS 4,155,962  5/1979  Neefe .................................. 425/808
4,919,850  4/1990  Blum et al. ........................... 264/1.7

*Primary Examiner*—W. Gary Jones
*Assistant Examiner*—Brenda Lamb
*Attorney, Agent, or Firm*—Kinney & Lange

[57] ABSTRACT

Plastic ophthalmic lenses are coated with a scratch-resistant coating using a spin coating process. The lenses are separated from lens mold pieces, and the lenses are routed through a coating system where the lens coating in applied. A conveyor moves the lens mold pieces toward an inspection station while the corresponding lenses are moving through the coating system. The operation of the lens coating system and the conveyor are coordinated so that the coated lens and the lens mold pieces from which that lens was made are delivered as a group to the inspection station.

9 Claims, 3 Drawing Sheets

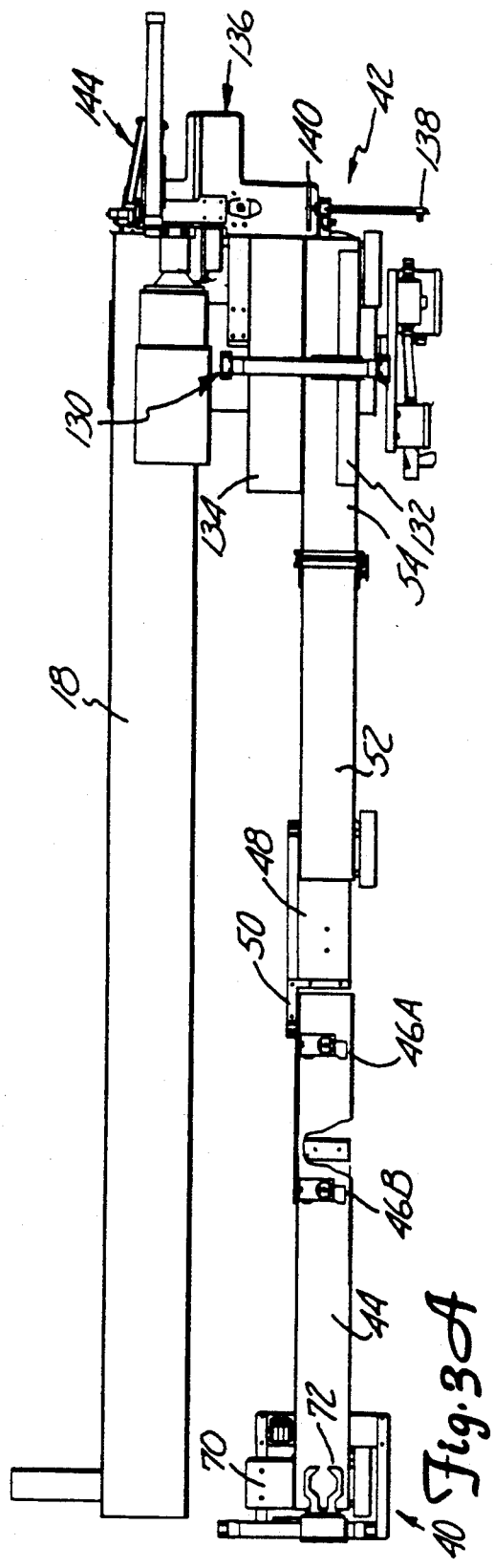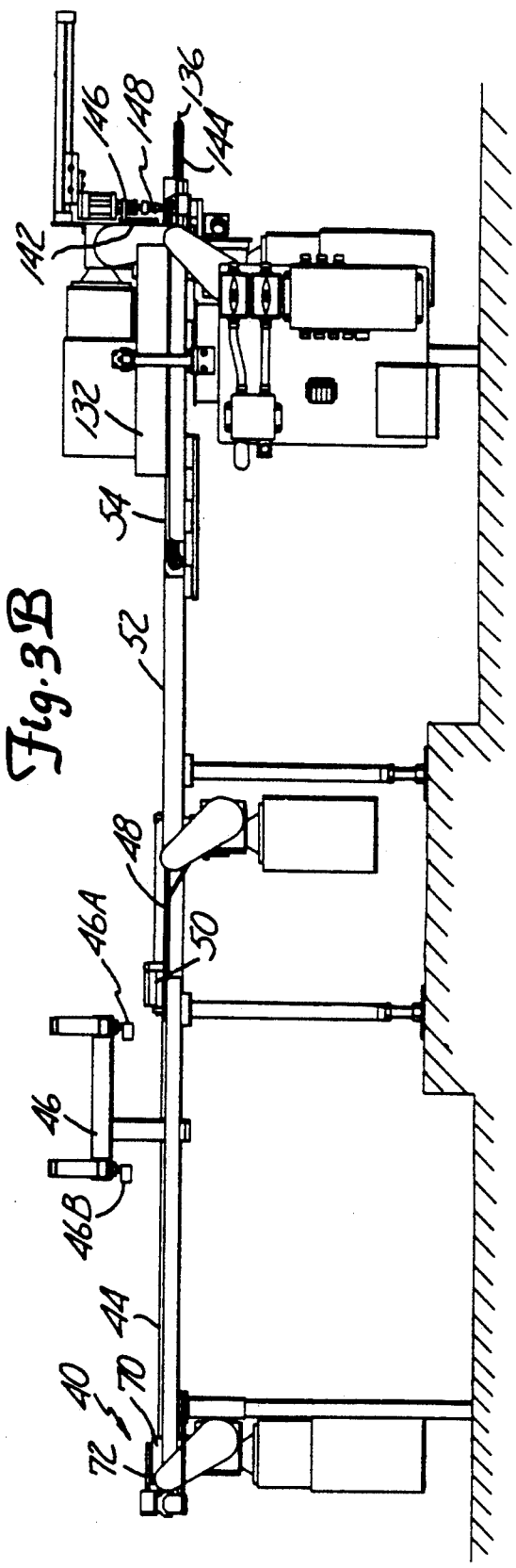

5,246,499

APPARATUS FOR APPLYING SCRATCH-RESISTANT COATINGS TO PLASTIC OPHTHALMIC LENSES

This is a divisional of application Ser. No. 07/703,251, filed May 20, 1991, now U.S. Pat. No. 5,161,228.

BACKGROUND OF THE INVENTION

The present invention relates to scratch-resistant coatings for plastic optical elements. In particular, the present invention relates to a system and method for large scale production of plastic ophthalmic lenses having a scratch-resistant coating.

Plastic ophthalmic lenses have become increasingly popular because of their lighter weight, reduced bulk and greater shatter resistance than glass lenses. One commonly used monomer system for forming plastic ophthalmic lenses is allyl diglycol carbonate (which is sold under the trademark CR-39).

CR-39 plastic ophthalmic lenses are typically formed by casting the CR-39 monomer in a mold formed by a pair of glass mold pieces connected together by a gasket. The interior of the mold is filled with the CR-39 monomer, and the filled mold is then subjected to a curing process.

CR-39 plastic ophthalmic lenses are relatively hard and scratch-resistant when compared to other plastic ophthalmic lenses. The scratch-resistance of CR-39 lenses, however, is lower than that of glass. As a result, there has been a significant effort expended to develop scratch-resistant coatings for CR-39 and other plastic ophthalmic lenses.

A wide variety of different coating techniques and materials have been proposed over the years. These include applying coating solutions by spin, dip, spray or flow coating. In recent years, considerable effort has been expended in developing "in-mold" coating techniques, in which a coating is applied to a surface of a mold and then transferred to the lens as the lens monomer is cured in the mold.

In the case of spin, dip, spray or flow coating processes, the coating is applied after the CR-39 lens has been cured, and the lens has been removed from the mold.

The glass mold pieces used in casting CR-39 lenses are expensive, and therefore are reused many times before they are replaced. If a glass mold piece has a defect which will cause a lens made with that mold piece to be rejected, it is important that the defective mold piece be identified, removed, and replaced.

SUMMARY OF THE INVENTION

The present invention is a system for the automated coating of plastic ophthalmic lenses which permits the identification of lens mold pieces which contain defects. In the present invention, plastic ophthalmic lenses are separated from lens mold pieces at a lens mold opening station. The plastic ophthalmic lenses are directed to a coating system which applies a scratch-resistant coating to the lenses. The coating system receives uncoated lenses from the lens mold opening station, and delivers coated lenses at an outlet.

An inspection station is located near the outlet of the coating system. The inspection station receives coated lenses, and also receives lens mold pieces. It is at the inspection station that the coated ophthalmic lenses are inspected to see whether they meet quality standards.

A mold conveyor conveys the lens mold pieces from the lens mold opening station to the inspection station while the lenses are being coated in the coating system.

A controller coordinates operation of the lens coating system and the mold conveyor so that the coated lens and the lens mold pieces from which that lens was made are delivered as a group to the inspection station. With the present invention, therefore, any defects in the final coated lens which are due to a defective mold piece can be identified. Corrective action, which normally involves the removal of the defective mold piece from the process, can then be taken.

BRIEF DESCRIPTION OF THE DRAWINGS

FIGS. 3A and 3B are top and front views of the conveyors used in the preferred embodiment shown in FIG. 2.

DETAILED DESCRIPTION OF THE PREFERRED EMBODIMENTS

Figure 1:
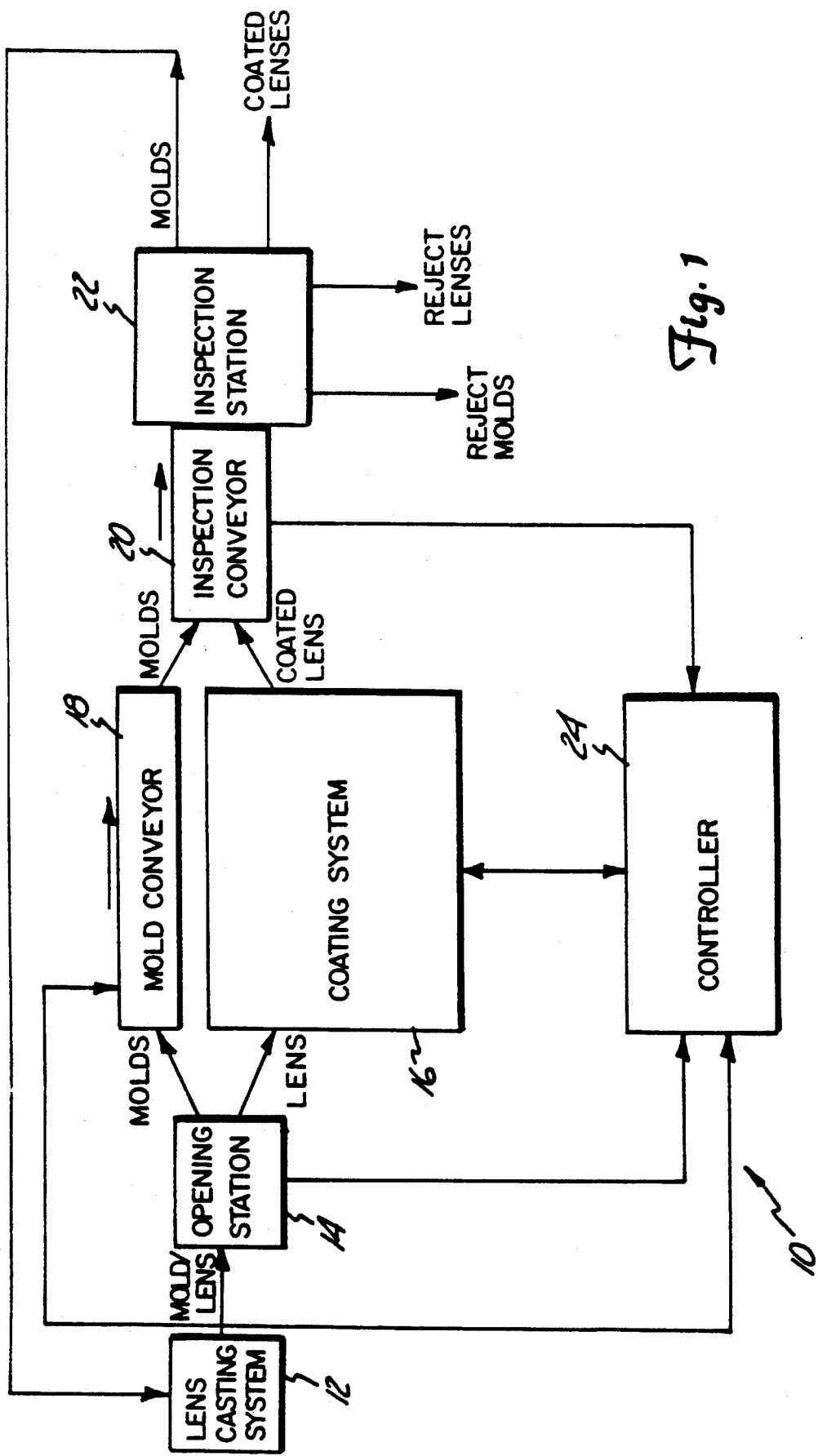
FIG. 1 is a block diagram of the system of the present invention.

FIG. 1 shows a system 10 for manufacturing coated plastic ophthalmic lenses. System 10 includes lens casting system 12, opening station 14, coating system 16, mold conveyor 18, inspection conveyor 20, inspection station 22, and controller 24.

At lens casting system 12, glass mold pieces and gaskets are assembled and are filled with a plastic monomer (such as CR-39 monomer). The filled lens molds are then subjected to a curing process (typically a thermal cure) during which time the monomer within the mold polymerizes and hardens to form a plastic lens. The major surfaces of the lens are defined by the interior surfaces of the two glass mold pieces.

At the end of the curing process, the molds containing lenses are supplied to opening station 14. The gasket which holds the two mold pieces together is cut, removed, and discarded. An operator at the opening station uses a prying blade to separate the cast lens from the front and back glass mold pieces.

Normally, the operator at the opening station places the two mold pieces side by side on mold conveyor 18. At the same time, the lens made from those two mold pieces is placed at the inlet to coating system 16. The lens is conveyed into coating system 16 where it is automatically processed to form a scratch-resistant coating on the front surface of the lens.

In one preferred embodiment of the present invention, which will be described in more detail later, coating system 16 applies a scratch-resistant coating by a spin coating process of the type described in copending patent application Ser. No. 07/647,037 by Jorge M. Rodriguez, "SCRATCH-RESISTANT COATING AND METHOD OF MAKING COATED LENSES" filed Jan. 29, 1991 and assigned to the same assignee as the present application.

Coating system 16 preferably is a fully-automated, clean-room type of system, in which lenses are moved from station to station within the coating system by an industrial robot. The lenses are conveyed into the coating system, are moved to a washing station, then to a coating station, and finally to a curing station before being conveyed to the outlet of coating system 16.

Coated lenses from coating system 16 and mold pieces from mold conveyor 18 are supplied to inspection conveyor 20. Inspection conveyor 20 indexes, under the control of an operator at inspection station 22, to successively bring each coated lens and its corresponding mold pieces to the inspection station 22. Inspectors at inspection station 22 check the coated lens for imperfections, and either pass or reject each lens. In other words, there is a one hundred percent visual inspection of the coated lenses at inspection station 22. When a lens is rejected, the inspector also determines whether the defect in the lens is a result of the coating process, or as a result of a defective mold piece. If the problem is a defective mold piece, the mold piece is rejected.

Those coated lenses which pass the inspection station are passed on for labelling and packaging. The molds which are still in acceptable condition are returned to the lens casting system 12, where they are reused.

The overall operation of system 10 is coordinated by controller 24. In the preferred embodiment, controller 24 is a digital computer or programmable logic controller which is interconnected to the controls, drive mechanisms and sensors of the various components of system 10. Controller 24 coordinates the operation of inspection conveyor 20, mold conveyor 18, and coating system 16 so that each coated lens which reaches inspection station 22 has with it the corresponding mold pieces from which that lens was made.

Figure 2:
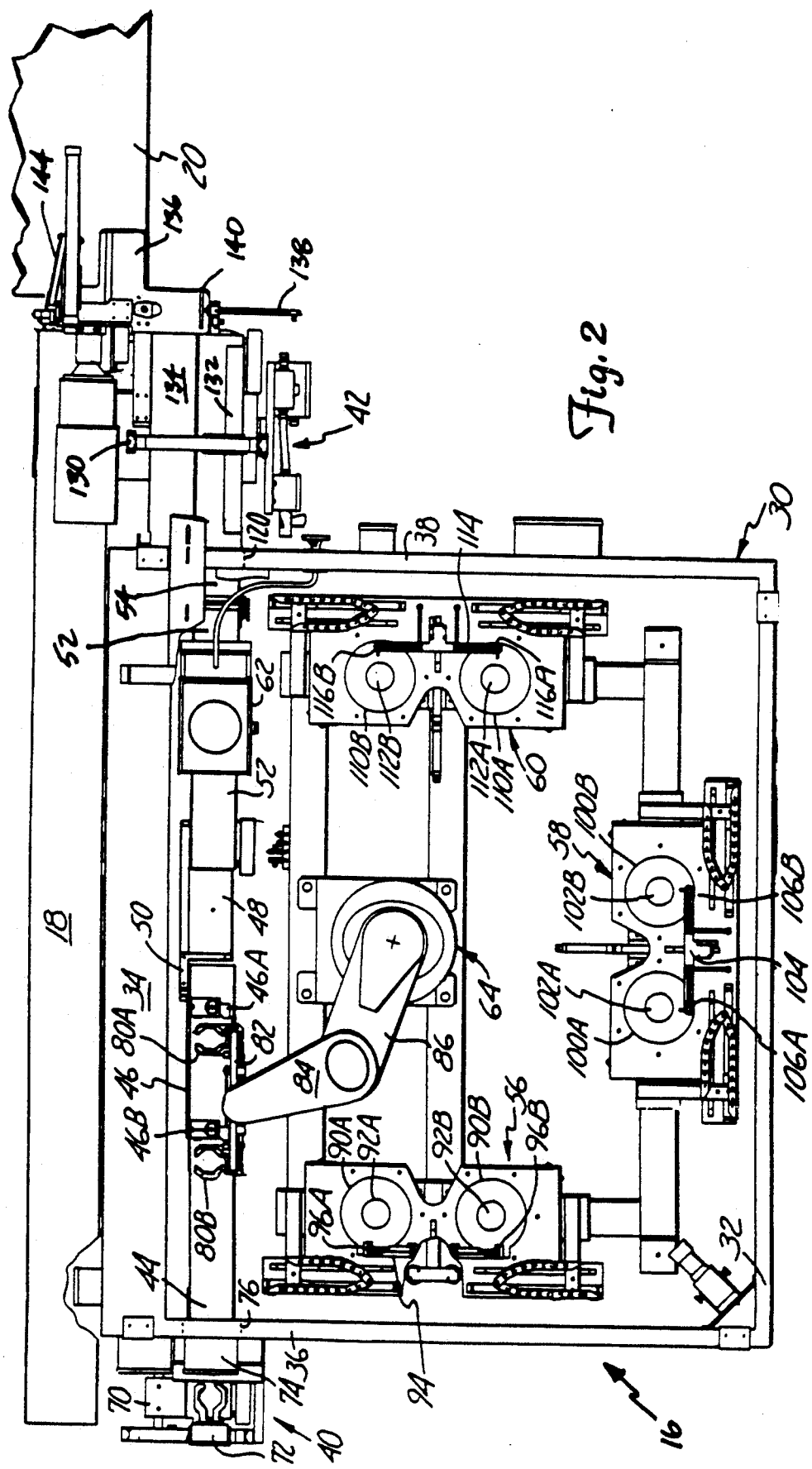
FIG. 2 is a top view showing the lens coating system and mold conveyor used in the preferred embodiment of the present invention.

FIG. 2 is a top view of coating system 16 and mold conveyor 18. FIGS. 3A and 3B are top and front views of mold conveyor 18 and the conveyor portions of coating system 16.

Coating system 16 includes a clean room enclosure 30 having a front wall 32, a back wall 34, and side walls 36 and 38. Located adjacent wall 36 of clean room is inlet station 40. Located adjacent wall 38 is outlet station 42.

Mold conveyor 18 runs parallel to, and is immediately adjacent, rear wall 34 of clean room 30. The inlet end of mold conveyor 18 is located adjacent inlet station 40, and the outlet end of mold conveyor 18 is located adjacent outlet station 42. Opening station 14 (shown in FIG. 1) is located immediately adjacent inlet station 40 and the inlet end of mold conveyor 18, so that an operator at the opening station can place mold pieces on conveyor 18 and a lens corresponding to those mold pieces at inlet station 40.

Inspection conveyor 20 is positioned adjacent outlet station 42 and the outlet end of mold conveyor 18. As discussed previously, the operation of coating system 16 and mold conveyor 18 is synchronized to the operation of inspection conveyor 20 so that a coated lens and the mold pieces used to form that lens are advanced in an indexing fashion and are reunited at inspection conveyor 20.

Coating system 16 includes infeed conveyor 44, positive lens locator 46, plate 48, lens pusher 50, cure conveyor 52, outfeed conveyor 54, wash station 56, coating stations 58 and 60, UV cure station 62, and robot 64.

At inlet station 40, there is a receiving platform 70 which is adjacent the outer end of inlet conveyor 44. A moving gripper mechanism 72 moves from a first position over platform 70 (where it receives the lens) to a second position over infeed conveyor 44 (where gripper mechanism 72 deposits the lens) and then back to the first position. When conveyor 44 is indexed, the lens moves through destaticisor 74 and inlet opening 76 in wall 36 into the interior of clean room 30.

When lenses are located at stations defined by locators 46A and 46B of positive lens locator mechanism 46, they are in position to be gripped by gripper mechanism 80A and 80B of robot 64. Grippers 80A and 80B are mounted on end of arm tool (EOAT) 82, which in turn is connected to the outer end of an arm mechanism which includes arms 84 and 86 of robot 64.

As will be described in more detail later, a pair of lenses are moved by robot 64 from infeed conveyor 44 to wash station 56, where the lenses are washed.

As shown in FIG. 2, wash station 56 includes a pair of washbowls 90A and 90B, a pair of spindles 92A and 92B located within bowls 90A and 90B, respectively, and a nozzle mechanism 94 having spray nozzles 96A and 96B for spraying washing solution onto lenses which are held and rotated by the upper ends of spindles 92A and 92B.

Coating stations 58 and 60 have constructions which are generally similar to wash station 56. Coating station 58 has a pair of bowls 100A and 100B with a pair of lens supporting spindles 102A and 102B, respectively. A coating arm assembly 104 has nozzles 106A and 106B which can be moved radially inward and outward over spinning lenses to apply coating solution to the lenses supported on spindles 102A and 102B.

Coating station 60 includes a pair of bowls 110A and 110B containing spindles 112A and 112B, respectively. Coating arm assembly 114 has a pair of coating nozzles 116A and 116B which can be moved radially over lenses mounted at the top ends of spindles 112A and 112B to apply coating solution to the surface of lenses mounted on spindles 112A and 112B.

The system shown in FIG. 2 makes use of a wash cycle which is completed in roughly one half of the time required to complete a coating cycle. As a result, one wash station 56 can be used to provide lenses to two coating stations 58 and 60.

After the lenses have been coated at either station 58 or station 60, robot 64 moves the coated lenses into position to be fed through UV cure station 62. In particular, robot 64 places one lens onto conveyor 52 and the other lens onto drop point shuttle plate 48.

Conveyor 52 is a continuously running conveyor belt (as opposed to an indexing type of conveyor belt). Sensors are positioned both at the inlet and the outlet of UV curing station 62 and indicate when a lens enters and exits the UV curing station. When the first lens of a pair has exited the UV curing station 62, shuttle 50 pushes the second lens off plate 48 and onto conveyor 52.

Outfeed conveyor 54 picks up the lens at the outlet end of UV conveyor 52. Outfeed conveyor 54 is an indexing type conveyor which moves the lens out of clean room 30 through outlet opening 120 in wall 38.

Outlet station 42 is located near opening 120 in wall 38, and is positioned to receive the lenses being carried on outfeed conveyor 54. Positioned at outlet station 42 is outfeed buffer shuttle assembly 130, which includes a shuttle 132 capable of pushing one or more lenses transversely across conveyor 54 onto buffer conveyor 134. At the outlet end of buffer conveyor 134 is lens/mold shuttle plate 136. Push cylinder assembly 138 includes a pusher 140 which pushes a lens received on plate 136 transversely to a point where a rake 142 can pull the lens onto inspection conveyor 20.

Also located at station 42 is a front mold transfer assembly 144 (which is formed by four parallel rubber belts), and back mold transfer assembly 146, which includes a suction element 148 on a pivotal arm 148 which picks up the back lens mold and places the back mold in position on inspection conveyor 20.

The spin coating process of the present invention presents a challenge because lenses are separated from their corresponding mold pieces while the lenses go through the coating process. The objective of the present invention is to sequence the mold pieces and the lenses so that they will arrive together at the inspection conveyor, and will be conveyed together to the inspection station.

There are several possible situations which can disrupt normal flow and can, if not accommodated, result in mold pieces and lenses getting out of synchronization.

First, because the molds are being opened manually, there is a possibility that an operator at the opening station 14 may fall behind. As a result, the operator will not place a lens at the input of coating system 16. This results in a "skip" or "space" in the flow of lenses through the system.

Second, in some cases the lens coming out of the mold is obviously defective. In that case, the operator does not even put the lens through coating system 16, but the operator does place the mold pieces onto mold conveyor 18. If system 10 is operating properly, the mold pieces will arrive at inspection station 22, but there will be no corresponding lens. If this is not accomplished, all subsequent lenses will be out of synchronization with their respective mold pieces.

Third, the inspection line can slow down or even stop. This potentially can cause a back up of lenses flowing through coating system 16. Any slowing down or stoppage of inspection conveyor 20, however, must not jam or otherwise disrupt the operation of coating system 16, or disrupt the synchronization of coated lenses and mold pieces.

In the present invention, inspection conveyor 20 is used as the master control for synchronization of system 10. Controller 24, which is preferably a programmable logic controller, receives a signal from inspection conveyor 20 each time inspection conveyor 20 is indexed.

If inspection conveyor is stopped, controller 24 takes appropriate action with coating system 16 so that coating system 16 does not accept additional lenses until the inspection conveyor 20 restarts. In the present invention, coating system 16 has the ability to move the remaining lenses which have gone through UV cure station 62 out to a holding or buffer area (buffer conveyor 134) while awaiting the restarting of inspection conveyor 20. In this way, no lens is left under the UV lamp of the UV station 62.

Mold conveyor 18 indexes each time that inspection conveyor 20 indexes. Controller 24 receives a signal from inspection conveyor 20 each time that inspection conveyor 20 indexes. If controller 24 is ready to perform an operation within coating system 16 as a result of indexing of inspection conveyor 20 (and mold conveyor 18) it responds to the index signal. If coating system 16 is not ready, controller 24 simply skips the cycle and waits for the next index signal to be received from inspection conveyor 20.

At opening station 14, an operator manually disassembles the lenses and molds. The molds are placed on mold conveyor 18 in side-by-side fashion, with the back mold closest to the clean room 30, and the front mold furthest from clean room 30 on conveyor 18.

Assuming that the lens is not obviously defective, the operator places the lens on infeed shuttle platform 70. Infeed shuttle gripper assembly 72 is normally positioned over platform 70. A sensor associated with platform 70 indicates to controller 24 that a lens is present. A sensor associated with infeed conveyor 44 verifies to controller 24 that infeed conveyor 44 is stopped. Controller 24 than energizes a valve to cause infeed shuttle gripper 72 to move the lens from platform 70 onto infeed conveyor 44. Sensors associated with gripper 72 verify to controller 24 that the lens has been transferred to infeed conveyor 44.

In response to an index signal from inspection conveyor 20, controller 24 energizes infeed conveyor 44, which causes conveyor 44 to move by a predetermined distance (in a preferred embodiment, 13.5 inches). This distance moves the lens which was at the outer end of infeed conveyor 44 through destaticisor 74 and entrance 76 into clean room 30.

This first position of the lens within clean room 30 is mid-way between the location of gripper 72 and the location of lens locator 46B shown in FIG. 2.

The operation of the infeed conveyor continues with each indexing of inspection conveyor 20. When infeed conveyor 44 is indexed enough times so that one lens is at the position defined by a positive lens locator 46A and a second lens is at a location defined by a positive lens locator 46B, sensor signals to controller 24 indicate that lenses are ready to picked by EOAT 82 of robot 64.

As shown in FIG. 3B, positive lens locators 46A and 46B are normally positioned above conveyor 44. During each indexing cycle of infeed conveyor 44, lens locators 46A and 46B are moved down over infeed conveyor 44 so that infeed conveyor 44 can slightly over-travel while locators 46A and 46B stop lenses which are being carried on conveyor 44. Once conveyor 44 stops, locators 46A and 46B are retracted upward into the position shown in FIG. 3B.

When lenses are in position along infeed conveyor 44 so that they can be picked up by EOAT 82, controller 24 signals robot 64. Robot 64 moves EOAT 82 to the lens pick point, and grippers 80A and 80B grasp the two lenses. Sensors associated with grippers 80A and 80B verify that lenses are present.

Controller 24 signals robot 64 that wash station 56 is clear. Robot 64 moves EOAT 82 to wash station 56, and the lenses are placed on vacuum suction cups at the upper ends of spindles 92A and 92B of wash station 56. Controller 24 then energizes wash station 56.

When the wash cycle is complete, controller 24 signals robot 64, which moves EOAT 82 to pick up the lenses at wash station 56. The robot grippers 80A and 80B grasp the lenses; an the gripper sensors verify that the lenses are present.

Controller 24 signals robot 64 that coating station 58 is clear. Robot 64 removes the lenses to coating station 58 and places the lens on the suction cups at the upper ends of 102A and 102B. Robot 64 signals controller 24 to indicate that the lenses are in position for coating, and controller 24 energizes coating station 58.

In the meantime, robot 64 has gone back to the lens pick point (on infeed conveyor 44) and picked up another pair of lenses. Those lenses are deposited on spindles 92A and 92B of wash station 56. When the wash cycle is done, robot 64 moves the lenses from wash station 58 to second coating station 60.

Robot 64 then goes back, gets another pair of lenses and deposits them on the spindles of wash station 56. By this time, first coating station 58 has completed a coating cycle, and has provided a signal to controller 24. Controller 24 signals robot 64, which picks up the two lenses from coating station 58 and deposits the first lens on UV conveyor 52 and the second lens on shuttle plate 48. Robot 64 then continues its operation by moving the lenses at wash station 56 to first coating station 58.

The lens which has been deposited on UV conveyor 52 passes through UV station 62. Robot 64 has sent a signal to controller 24 to indicate that a lens has been placed on shuttle plate 48. When the first lens passes out of UV cure station 62 and is sensed as it moves onto conveyor 54, a signal is sent to controller 24. This indicates that conveyor 52 is clear. Controller 24 energizes a valve to actuator shuttle 50 which pushes the second lens off of shuttle plate 24 and onto conveyor 52. Sensors verify to controller 24 that shuttle 50 has cycled.

The operation of the lens wash station 56 and the operation of the coating stations 58 and 60 are controlled by controller 24. Stations 56, 58 and 60 use bowls which surround the spindles on which the lenses are mounted. The bowls have retractable front slides which can be raised and lowered. The slides are raised during the spin washing or coating cycle and are lowered to permit EOAT 82 to move in and out in order to place lenses in and take lenses out of the station.

When lens wash station 56 is ready to receive lenses, sensors signal controller 24 that the bowl slides have been lowered. Controller 24 provides a signal to robot 64 indicating that wash station 56 is ready for operation.

Once robot 64 has placed lenses on spindles 92A and 9B of wash station 56, robot 64 signals controller 24. Controller 24 activates a valve which allows cylinders to raise the slides of the bowls 90A and 90B. Sensors signal controller 24 when the bowl slides have been raised. Controller 24 energizes the spin drive mechanism. Controller 24 then causes the arm mechanism 94 to extend and turns on a valve which allows the cleaning solution (such as isopropyl alcohol) to be supplied through nozzles 96A and 96B. Controller 24 then turns off the flow of isopropyl alcohol, deenergizes the spin drive, and lowers the bowl sides. When sensors have verified that the bowl slides have been lowered, controller 24 signals robot 64 to indicate that a wash cycle is complete. This indicates to robot 64 that it can pick up the lenses from wash station 56 and move them to either coating station 58 or coating station 60, depending on which station is available.

The operation of the lens coating stations 58 and 60 is similar in many respects to the operation of lens wash station 56. Sensors verify through controller 24 that bowl slides are retracted, and controller 24 signals robot 64 that the coating station (58 or 60) is ready for operation.

Once the lenses have been deposited in the coating station (58 or 60), robot 64 signals controller 24 indicating that a coating cycle can begin. Controller 24 then energizes a valve to cause the bowl slides to be raised in preparation for the coating operation.

Controller 24 energizes the spin drive mechanism, energizes a valve to extend the coating arm 104 or 114, and energizes a valve to begin the coating cycle.

Under the control of controller 24, the coating arm 104 or 114 is retracted, while coating fluid is being supplied through the nozzles 106A, 106B or 116A, 116B onto the lenses. Controller 24 deenergizes the valve which stops the coating process and deenergizes the spin drive mechanism at an appropriate time. The bowl slides are then allowed to lower. Once the slides have been lowered, controller 24 signals robot 64 to indicate that the coating cycle is complete.

Outfeed conveyor 54 is an indexing conveyor which is responsive to the sensing of lenses passing along conveyor 52 and through UV cure station 62. Conveyor 54 will continue to index as long as there are lenses moving through the UV station, even if the inspection conveyor 20 has stopped. Conveyor 54 has enough room so that it can accumulate several lenses along its length in order to empty the UV curing portion of coating system 16 in the event of a shut down of the remainder of the system or stopping of inspection conveyor 20. Controller 24 will continue to index outfeed conveyor 54 until sensor signals indicate to controller 24 that outfeed conveyor 54 is full.

Under normal operating conditions, with each cycle of inspection conveyor 20, buffer conveyor 134 will be indexed as well. In addition, outfeed conveyor 54 will be indexed to bring one lens at a time in to position along side buffer conveyor 134. Shuttle 130 is activated by controller 24 to push a lens or lenses across from outfeed conveyor 54 onto buffer conveyor 134. As stated previously, under normal conditions, one lens at a time will be deposited onto buffer conveyor 134. At the outlet end of buffer conveyor 134, the lens is deposited onto shuttle plate 136. Each time buffer conveyor 134 indexes, controller 24 causes pusher cylinder 138 to drive pusher 140 forward which pushes a lens into position on plate 136 where rake 142 can pull the lens onto inspection conveyor 20.

The mold pieces are indexed along mold conveyor 18 through a series of steps determined by cycles of inspection conveyor 20. The number of steps is coordinated with the steps required to move a lens through coating system 16, so that the lens which is pushed into position by pusher 140 corresponds to the mold pieces arriving at the outlet end of conveyor 18. The mold pieces are picked up by a set of four rubber belts which form a conveyor 144. As a result, the mold pieces are deposited onto inspection conveyor 20 by conveyor 144.

When rake 142 is moved toward inspection conveyor 20, mechanism 146 also moves into position, picks up the back mold piece by vacuum cup 148, and rotates through a 90° arc to deposit the back mold piece along side the lens.

With the present invention, lenses are moved through coating system 16 in a step-wise fashion under the control of controller 24. Controller 24, in turn, receives synchronizing signals from the inspection conveyor, and coordinates the operation of coating system 16 so that the lens and its associated mold pieces arrive together at the inspection conveyor 20.

As a part of this coordinated indexing operation, controller 24 provides signals to robot 64 to move lenses two-at-a-time from station to station. Robot 64 will not move lenses with in coating system 16 unless there is an open position for those lenses downstream. This prevents a blockage of coating system 16 in the event that inspection conveyor 20 is stopped for any reason.

Because robot 64 includes EOAT 82 with grippers 80A and 80B which can sense whether a lens is in position, missing lenses (such as lenses which are discarded as defective) can be accommodated in the system and a gap left in the flow of lenses through coating system 16 so that lenses and corresponding mold pieces remain in synchronization.

In conclusion, the present invention is an automated spin coating system which permits plastic ophthalmic lenses to be coated on a mass production basis without human intervention while facilitating 100% inspection of lenses and lens molds after the lenses have been coated.

Although the present invention has been described with reference to preferred embodiments, workers skilled in the art will recognize that changes may be made in form and detail without departing from the spirit and scope of the invention.

What is claimed is:

1. A apparatus for coating plastic ophthalmic lenses, the apparatus comprising:
   a lens mold opening station at which uncoated plastic ophthalmic lenses are separated from lens mold pieces;
   a coating system for applying a scratch-resistant coating to an exterior surface of the uncoated lenses to produce coated lenses, the lens coating system having an inlet for receiving the uncoated lenses from the lens mold opening station, at least one coating station at which a coating is applied to the exterior surface of the uncoated lenses, an outlet at which coated lenses are delivered and means for moving lenses along a first path from the inlet through the coating system to the outlet;
   an inspection station located adjacent the outlet of the coating system;
   a mold conveyor for conveying the lens mold pieces, after they are separated from the uncoated lenses, from the lens mold opening station to the inspection station along a second path which is different from the first path; and
   means for coordinating operation of the lens coating system and the mold conveyor so that the coated lens and the lens mold pieces from which that lens was made are delivered as a group to the inspection station.

2. The apparatus of claim 1 wherein the inspection station includes an inspection conveyor for conveying lenses and corresponding mold pieces through the inspection station.

3. The apparatus of claim 2 wherein the means for coordinating operation is responsive to operation of the inspection conveyor for coordinating operation of the conveyor and the lens coating system.

4. The apparatus of claim 3 wherein the inspection conveyor operates on an indexing basis.

5. The apparatus of claim 1 wherein the coating system includes a wash station for washing lenses and a UV station for curing the coating applied to the exterior surface of the uncoated lenses; and wherein the means for moving lenses from the inlet through the coating system to the outlet comprises:
   an infeed conveyor for moving lenses from the lens opening station into the lens coating system;
   an outfeed conveyor for moving lenses from the UV station to the outlet of the coating system; and
   a robot for moving lenses from the infeed conveyor to the wash station to the first coating station, and the first coating station to an inlet to the UV station.

6. The apparatus of claim 5 wherein the coating system includes:
   a cure conveyor for moving lenses from an inlet to an outlet of the UV station.

7. The apparatus of claim 5 wherein the robot includes an arm having a tool for grabbing the lens by its side surfaces when moving the lens from station to station.

8. The apparatus of claim 5 and further comprising means for neutralizing static charge on the surface of the lens, the means for neutralizing static charge being positioned adjacent the inlet to the coating system.

9. The apparatus of claim 5 wherein the coating system further includes:
   an enclosure having an inlet opening through which the infeed conveyor transports lenses and an outlet opening through which the outfeed conveyor transports coated lenses, the wash station, the coating station, the UV station, and the robot being located within the enclosure.

* * * * *

UNITED STATES PATENT AND TRADEMARK OFFICE
CERTIFICATE OF CORRECTION

PATENT NO. : 5,246,499

DATED : September 21, 1993

INVENTOR(S) : JOSEPH L. PERALTA, JORGE M. RODRIQUEZ

It is certified that error appears in the above-identified patent and that said Letters Patent is hereby corrected as shown below:

```
On the Title Page
   delete [75] Inventors:    Joseph L. Peralta, Hollywood;
                             M. Rodriquez, Miami, both of Fla.

insert   [75] Inventors:  Joseph L. Peralta, Hollywood
                             M. Rodriguez, Miami, both of Fla.
```

Signed and Sealed this

Twenty-second Day of March, 1994

Attest:

BRUCE LEHMAN

*Attesting Officer*   *Commissioner of Patents and Trademarks*